United States Patent

Rodewald et al.

Patent Number: 5,519,990
Date of Patent: May 28, 1996

[54] ROUND BALING PRESS

[75] Inventors: Peter Rodewald, Braunschweig; Jürgen Röhrebein, Vechelde; Dieter Wilkens, Wolfenbüttel, all of Germany

[73] Assignee: Welger GmbH, Wolfenbüttel, Germany

[21] Appl. No.: 344,195

[22] Filed: Nov. 23, 1994

[30] Foreign Application Priority Data

Nov. 26, 1993 [DE] Germany .............. 9318117 U

[51] Int. Cl.$^6$ ............................................. A01F 1507
[52] U.S. Cl. ......................................... 56/341; 100/88
[58] Field of Search .................... 56/341, 343, 432, 56/433; 100/88, 89

[56] References Cited

U.S. PATENT DOCUMENTS

| | | | |
|---|---|---|---|
| 4,766,717 | 8/1988 | Thomann | 56/341 |
| 4,803,832 | 2/1989 | Crawford | 56/341 |
| 4,955,188 | 9/1990 | von Allworden | 56/341 |
| 5,092,114 | 3/1992 | Eggemueller | 56/341 |

FOREIGN PATENT DOCUMENTS 4211518 10/1993 Germany .
4308646 9/1994 Germany .

Primary Examiner—Terry Lee Melius
Attorney, Agent, or Firm—Anderson Kill Olick & Oshinsky

[57] ABSTRACT

A round baling press for agricultural stalk grains is disclosed which comprises revolving pressing elements wherein the revolving pressing elements include at least one of rollers, conveyors belts, conveyor bar chains and similar items, and further wherein the revolving pressing elements bound a pressing space. The revolving pressing elements are driven on their side facing the pressing space in a region of a commodity inlet aperture so as to revolve from a bottom to a top. The round baling press also comprises a revolving conveyor arrangement, wherein the revolving conveyor arrangement is driven in a same peripheral direction as the pressing elements. The revolving conveyor arrangement is disposed between a pickup and the commodity inlet aperture. The conveyor arrangement further comprises a conveyor roller having rigid prongs which are disposed directly upstream of the commodity inlet aperture and above a supply channel base so as to be rotatably fixed in a supply channel. One of a stripping and a wipe-off grid is allocated to the prongs. The supply channel discharges into the pressing space approximately at a level of a pressing space base.

7 Claims, 1 Drawing Sheet

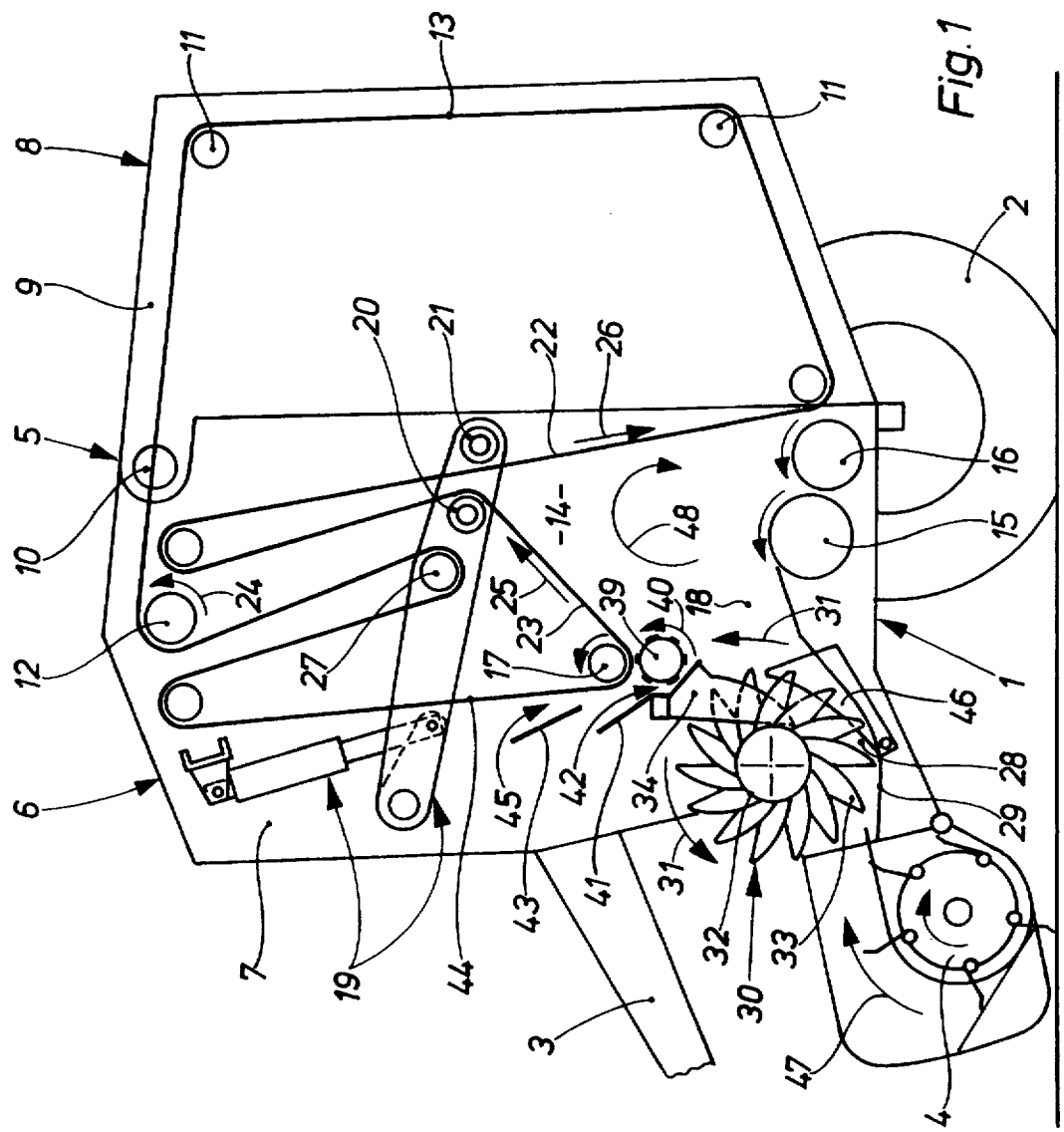
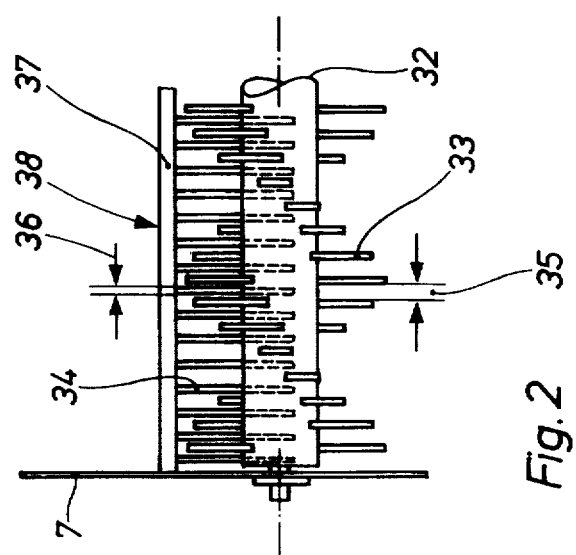
Fig. 1
Fig. 2

ROUND BALING PRESS

FIELD OF THE INVENTION

The present invention deals with a round baling press for agricultural stalk grain commodities which has a pressing space which is bounded, on its perimeter, by revolving pressing elements, such as, for example, rollers, conveyor belts, conveyor bar chains, or similar items, which are driven on their side facing the pressing space in the region of the commodity entrance aperture proceeding from the bottom and revolving towards the top. A conveyor device, revolving in the same peripheral direction as the pressing elements, is disposed between a pickup device and the commodity entrance aperture.

BACKGROUND OF THE INVENTION

Cutter mechanisms, known from the forage loading wagon sector, have been requested for some time now in increasing amounts also for round baling presses. Herein, there result among other things, advantages such as an increase in density of the round bale and an easier unraveling or dispersing in the course of utilization, in particular, with silage as a pressed commodity. Up to the present time, cutting mechanisms, in the form of conveyor rotors which coact with knives, were largely used in actual practice in fixed chamber presses with rollers as pressing elements and are there disposed in the feed channel between the pickup device and the commodity entrance aperture. (See Prospectus RP 200 of the applicants identification number BP 329/993/12/28 pl).

The so-called roller presses have few problems as far as winding or rolling of silage commodities around the pressing roller is concerned, and also, due to the multiple possibilities of introducing tie-up means through the gap between two rollers. However, considerable difficulties arise in the wipe-off or stripping of the cut-up material from the conveyor rotor. This is a specific round baling press problem. On the one hand, the direction of rotation for the round bale at the commodity feed aperture is always acting from the top in all round balers which operate in actual practice. On the other hand, the conveyor rotor has a velocity vector directed towards the top in the region of the commodity feed aperture so that the conveyor rotor works counter to the bale rotation. Material blockage results in the region of the wipe-off device and the "overhead entrainment" of material by the conveyor rotor. In addition, this problem is complicated in round balers, with endlessly revolving conveyor belts or bar conveyor chains, where the tie-up means can be introduced only through the commodity feed aperture during the period of commodity supply into the pressing space.

A round baler with a cutting mechanism located upstream of the commodity inlet aperture is known from the DE-OS 27 40 339, wherein the conveyor members of an elevator and a bale rotating in the pressing space revolve in the same direction of rotation. It is disadvantageous in this proposal, which has not become known in actual practice, that there is a relatively long distance between effective conveyor prongs of the cutting mechanism and the bale. A top cover plate is meant to bridge over this distance. However, this causes material back-up and brakes the bale, which, as is well known, swells in a commodity inlet aperture. In addition to the above, this proposal is expensive, cumbersome and requires a greater constructional length of the round baler.

SUMMARY OF THE INVENTION

The present invention is based upon the task of improving the material flow of the round baler in the region of the commodity entrance aperture, as well as, avoiding wipe-off problems. The present invention is further based on the additional task of creating a round baling press which has a compact construction in spite of using a cutter mechanism.

These tasks are solved in the present invention in that the conveyor arrangement consists of a conveyor roller which has rigid prongs which are disposed directly upstream of the commodity entrance aperture and above a supply channel base so as to be stationary, but rotatable, in the press space housing. A wipe-off grate is allocated to the prongs.

The tasks of the present invention are solved by providing a round baling press for agricultural stalk grains, which has a pressing space which is bounded peripherally by revolving pressing elements, as for instance, rollers, conveyor belts, conveyor bar chains and similar items, which are driven on their side facing the pressing space in the region of the commodity inlet aperture so as to revolve from the bottom to the top. A revolving conveyor arrangement, driven in the same peripheral direction as the pressing elements, is disposed between a pickup and the commodity inlet aperture. The conveyor arrangement consists of a conveyor roller with rigid prongs disposed directly upstream of the commodity inlet aperture, but above a supply channel base so as to be fixed but rotatable in the supply channel. A stripping or wipe-off grid is allocated to the prongs. The supply channel discharges into the pressing space approximately at the level of the pressing space base.

This disposition of the conveyor roller in the present invention has the following advantages. The commodity is actively conveyed through the commodity entrance aperture and no bale starting problems or blockages exist in the intake region. Further, during formation of the bales, the conveyor roller exerts an active conveyor action upon the round bale and, in particular, diminishes the known bulging of the bale in the region of the commodity entrance aperture, thereby resulting in a higher throughput or a higher pressing density at the same power consumption. The rotating round bale strips or wipes the pressed material also from the rotor prongs, thus causing no stripping problems, especially with silage. Lastly, a very compact constructional shape of the press is achieved by the integrated arrangements of the conveyor roller.

A particularly expedient embodiment of the round baler is provided in a round bale press described above which is further characterized by a variable pressing space which is bounded peripherally by endlessly revolving conveyor belts which are guided or driven by rollers. The region between the conveyor roller, or the stripping grate, and the bottom reversing roller of the conveyor belt, revolving in the front housing, comprises a driven pressing roller which extends across the entire pressing space width and which revolves in the same peripheral direction as the conveyor belt segments.

The pressing roller has a conveying peripheral surface. The roller is disposed so as to be somewhat offset into the pressing space so as to be spaced from the stripping grate which lies somewhat beneath the reversing roller.

Herein, for the first time, the integrated installation of a conveyor arrangement with and without cutting mechanisms is realized in a round baler which has a variable pressing space and conveyor belts as pressing elements and which provides surprising advantages compared to the known disadvantages of the so-called belt presses in silage, and especially, with a central supply of netting and/or string external of the commodity entry aperture. The combination of the conveyor roller with the reversal of the direction of rotation of the round bale, hitherto unknown in belt presses, which rotational direction in this invention proceeds towards the top out of the commodity entry aperture, has the surprising effect that the hitherto known problems of the accumulation of material in the belt segment, above the pickup device, are avoided with certainty as the bale itself conveys the material towards the top so that there is no possibility of accumulating there, and thus, no longer leads to undesirable windup phenomena around the reversing rollers.

The disposition of a pressing roller, between the conveyor rollers, or the stripper grate and the belt, has been shown to be particularly advantageous, which apart from the pressing function, has a stripping or wipe-off function as far as the stripper grate is concerned and, in addition, assures a dependable active introduction of the tie-up means into the pressing space. The tie-up means (string) can also be supplied without the pressing commodity and the netting resulting in a reduced tie-up period because the pressing commodity can still be supplied during the first bale revolution.

An above-described round baling press can be expediently constructed wherein the conveyor roller consists of a plurality of prongs which are disposed on a central tube, spaced sideways from each other, and offset with respect to each other, in a helical shape, in rotating direction, which cooperates with a stripping or wipe-off finger which engages from the top respectively in between two prongs. The prongs revolve in planes located so as to be parallel next to each other and perpendicular to the axis of the central tube. The prongs are disposed closely at approximately 15 mm next to each other and the thickness of the stripper fingers amounts to approximately half (6–8 mm) of the gap width of the prongs. This above-described arrangement facilitates a processing of the most difficult pressing commodities without any problems. The narrow wipe-off or stripping grate prevents "overhead" entrainment of material by the prongs.

Accordingly, it is an object of the present invention to provide a round baling press which provides improved material flow of the round baler in the region of the commodity entrance aperture, as well as, avoids wipe-off problems.

It is another object of the present invention to provide a round baling press which has a compact construction in spite of using a cutter mechanism.

Other objects and advantages of the present invention will be apparent to those skilled in the art upon a review of the Description of the Preferred Embodiment taken in conjunction with the Drawings which follow.

BRIEF DESCRIPTION OF THE DRAWINGS

In the drawings:

FIG. 1 illustrates a longitudinal section through a round baling press in the present invention with a variable pressing space and conveyor belts shown diagrammatically; and FIG. 2 illustrates a partial section of the conveyor roller and the stripping or wipe-off grate viewed from the front on the left side of the round baling press of FIG. 1.

DESCRIPTION OF THE PREFERRED EMBODIMENT

FIG. 1 illustrates a longitudinal section through a round baling press, which is the subject of the present invention. The round baling press has a mobile stand 1 with wheels 2, which can be hitched by a drawbar 3 to a tractor (not shown). A pick-up designated by the reference numeral 4, of the usual construction is disposed upstream of the wheels 2 in working direction of the round baler. The round baler can be coupled to the tractor for driving purposes by means of a universal shaft (not shown).

A pressing space housing designated generally by reference numeral 5 is disposed on the mobile stand 1 and consists of a front housing 6, integral with the stand, with front side walls 7 and a rear housing 8 with rear side walls 9 connected, in an articulated manner, to the front housing 6 where the rear housing 8 can be opened by swiveling around a top pivot axis 10 for bale ejection after same has been formed.

Several rollers 11, 12, mounted rotatably at the side walls 7, 9 are disposed between the oppositely located side walls 7 or 9. Several endless conveyor belts 13, which are disposed next to each other and which have a small spacing from each other, lie on the rollers 11, 12 which form an expandable bale pressing space 14 for forming a cylindrical bale between the sides 7, 9. The bale pressing space 14 is bounded, in a downward direction, by two rollers 15, 16, while commodity inlet aperture 18 is left free between the roller 15 and opposite the reversing roller 17 so as to be displaced towards the front and the top. The bale pressing space 14 is closed towards the top by two rollers 20, 21 which are disposed to be spaced closely to each other at a belt tightening device 19, which rollers guide two belt segments 22, 23 thereinbetween. The drive of the conveyor belts 13 occurs through the roller 12 which is driven in the direction of the arrow 24, for instance, by a chain drive (not shown) wherein the conveyor belt segments 22, 23 revolve in the direction of rotation designated by the arrows 25, 26.

The belt tightening device 19 is connected to a hydraulic system (not shown) and causes a controlled yielding of the rollers 20, 21, 27, and thereby, a corresponding release of the conveyor belt length with an increasing diameter of the bale.

The conveyance of the grain occurs by a pickup 4, through a supply channel 28, into the pressing space 14. A conveyor roller 30 is disposed in the supply channel 28 above a supply channel base 29 curved downwards. The conveyor roller 30 is rotatable on both ends, being however, supported in the supply channel 28 in a stationary manner and is driven in the direction of the arrow 31.

FIG. 2 illustrates a partial section of the conveyor roller and the stripping or wipe-off gate viewed from the front on the left side of the round baling press. The conveyor roller 30 consists of a central tube 32 which has a plurality of prongs 33, which are disposed spaced from each other and helically offset to each other, being welded to the central tube 32, which when the conveyor roller 30 revolves, plunge actively into the supply channel 28 so as to convey the material. A stripping or wipe-off finger 34 engages, from the top, respectively, into the gap between two prongs 33 on the side of the rotational path of the prongs 33 which face the commodity inlet aperture 18. The width of the gap 35 amounts to approximately 15 mm, while the stripping fingers 34, which are disposed approximately centrally in the gap, have a thickness 36 of approximately 6 mm. Several stripping fingers 34 are fastened next to each other on a cross tie 37 which extends between the front side walls 7 and form a stripping grate 38, which together with the central tube 32, constitutes the top supply channel wall.

A pressing roller 39, which has entrainment strips, is disposed directly beneath the reversing roller 17 so as to be offset rearwardly into the pressing space 14 with respect to the stripping grate 38. The pressing roller is driven in the direction of the arrow 40.

A baffle or guide-plate 41, which extends from the top towards the bottom, which is partially extended across the stripper grate 38, forms a supply gap 42 for the tie-up means between itself and the pressing roller 39. The tie-up means is, for instance, string. Another tie-up means, as for instance, netting, can be supplied by means of a second baffle plate 43 which is displaced towards the top, through the same supply channel 42, and forms, together with the external segment 44 of the conveyor belt 13, a sort of supply pit 45.

If the stalk grain is to be cut up prior to pressing, several knives 46 can be pivoted from below into the supply channel 28 so as to be distributed across its width. The knives 46 cooperate with the prongs 33.

The mode of operation of the round baling press is as follows. For the formation of a round bale, the harvested stalk grain is pushed by the pickup 4, in the direction of the arrow 47, into the supply channel 28 and is from there conveyed along a short path, by means of the conveyor roller 30, into the pressing space 14. Since the pressing space 14 comprises pressing elements 39, 23, 22, 15, 16, 30 which revolve on the entire periphery, in the same direction of rotation, the start of the bale rotation occurs without problems and the bale rotation in the direction of the arrow 48 is maintained up to the highest pressed densities hitherto not achieved by round bale presses. All materials are securely stripped off the conveyor roller 30. In the described embodiment with the conveyor belts 13, the tying-up proceeds without any obstruction after termination of the bale formation by means of string or cord, even without any supply of commodity, by means of the pressing roller 39 through the supply gap 42. If netting is used, the netting and pressing material can be supplied simultaneously even during nearly an entire bale revolution, which reduces the tie-up time period.

While the present invention has been described and illustrated in a preferred embodiment, such is merely illustrative of the present invention and is not meant to be construed as a limitation thereof. Accordingly, the present invention includes all modifications, variations and/or alternate embodiments with the scope of the present invention limited only by the claims which follow.

What is claimed is:

1. A round baling press for agricultural stalk grains, comprising:

revolving pressing elements, wherein said revolving pressing elements include at least one of rollers, conveyor belts, conveyor bar chains and similar items, wherein said revolving pressing elements bound a pressing space and include a pair of rollers defining a base of the pressing space, and further wherein said revolving pressing elements are driven on their side facing said pressing space in a region of a commodity inlet aperture so as to revolve from a bottom to a top;

a revolving conveyor arrangement, wherein sid revolving conveyor arrangement is driven in a same peripheral direction as said pressing elements, and further wherein said revolving conveyor arrangement is disposed between a pickup and said commodity inlet aperture, wherein said conveyor arrangement further comprises:

a conveyor roller having rigid prongs which are disposed directly upstream of said commodity inlet aperture and above a supply channel base so as to be rotatably fixed in a supply channel, and wherein a stripping grate is allocated to said prongs, further wherein said supply channel discharges into said pressing space approximately at a level of said pressing space base, and wherein said pressing space is a variable pressing space which is bounded peripherally by endlessly revolving conveyor belts which are driven by rollers, wherein a region between one of said conveyor roller and a stripping grate and a bottom reversing roller of one of said conveyor belts which revolves in a front housing, further comprises:

a driven pressing roller which extends across an entire pressing space width and revolves in a same peripheral direction as conveyor belt segments, wherein a pressing roller which has a conveying peripheral surface, is disposed so as to be somewhat offset into said pressing space so as to be spaced from said stripping grate and lies beneath said bottom reversing roller.

2. The round baling press of claim 1, wherein a tie-up means is supplied by said pressing roller into said pressing space through one of a gap between said pressing roller and said stripper grate and through a baffle or guide-plate which covers said stripper grate in a region of said tie-up means supply.

3. The round baling press of claim 2, wherein said baffle or guide-plates are disposed between two side walls in a supply region of said tie-up means so as to form together with an outer segment of said conveyor belt a supply pit for said tie-up means.

4. A round baling press for agricultural stalk grains, comprising:

a housing;

a plurality of revolving pressing elements supported in the housing and defining a variable pressing space, the plurality of revolving pressing elements including a pair of rollers forming a pressing space base and endless conveyor elements defining a periphery of the pressing space;

an inlet aperture through which the stalk grains enter the pressing space, the endless conveyor elements being driven on sides thereof facing the pressing space in a direction away from the pressing space base and upward from the inlet aperture;

a supply channel extending approximately at the level of the pressing space base for discharging the stalk grains into the inlet opening;

a conveyor roller arranged in the supply channel in a spaced relationship to a supply channel bottom for conveying the stalk grains through the supply channel and toward the inlet aperture, the conveyor roller having a plurality of rigid prongs provided on a conveyor roller circumference; and a grate cooperating with the prongs of the conveyor roller for stripping the stalk grains therefrom.

5. A round baling press according to claim 4, wherein the conveyor roller includes a central tube, the right prongs being disposed on the central tube in a sidewise spaced relationship relative to each other and being offset relative to each other circumferentially along a helicoid, and wherein the stripping grate comprises a plurality of fingers extending between the prongs.

6. A round baling press according to claim 5, wherein the prongs rotate in planes extending parallel to each other and perpendicular to an axis of the central tube, and wherein separate prongs are spaced from each other by about 15 mm and the stripping grate fingers have a thickness of about a half of a distance between the separate prongs.

7. A round baling press according to claim 4, further comprising knife means projecting into the supply channel, extending substantially along an entire width of the pressing space, and pivotable in opposite directions.

* * * * *

UNITED STATES PATENT AND TRADEMARK OFFICE
CERTIFICATE OF CORRECTION

PATENT NO. : 5,519,990
DATED : May 28, 1996
INVENTOR(S) : Peter Rodewald, Jurgen Rohrbein & Dieter Wilkens It is certified that error appears in the above-indentified patent and that said Letters Patent is hereby corrected as shown below:

On the title page, Item [75], should read:

Inventors: Peter Rodewald, Braunschweig; Jürgen Röhrbein, Vechelde; Dieter Wilkens, Wolfenbüttel, all of Germany Signed and Sealed this Sixth Day of August, 1996

Attest:

BRUCE LEHMAN

Attesting Officer

Commissioner of Patents and Trademarks